(12) United States Patent
Preishuber-Pfluegl

(10) Patent No.: US 6,900,153 B2
(45) Date of Patent: May 31, 2005

(54) SUPPORTED OLEFIN POLYMERIZATION CATALYSTS

(75) Inventor: Peter Preishuber-Pfluegl, Ludwiggshafen (DE)

(73) Assignees: E.I. Du Pont de Nemours and Company, Wilmington, DE (US); University of North Carolina at Chapel Hill, Chapel Hill, NC (US)

( * ) Notice: Subject to any disclaimer, the term of this patent is extended or adjusted under 35 U.S.C. 154(b) by 308 days.

(21) Appl. No.: 10/108,938

(22) Filed: Mar. 27, 2002

(65) Prior Publication Data

US 2002/0187892 A1 Dec. 12, 2002

Related U.S. Application Data

(60) Provisional application No. 60/307,985, filed on Jul. 26, 2001, and provisional application No. 60/279,207, filed on Mar. 28, 2001.

(51) Int. Cl.$^7$ .............. C08F 4/02; C08F 4/70; C08F 4/80
(52) U.S. Cl. ........ 502/104; 502/109; 502/120; 502/156; 502/158; 502/167; 526/161; 526/169.1; 526/171; 526/172
(58) Field of Search .............. 502/104, 109, 502/120, 156, 158, 167

(56) References Cited

U.S. PATENT DOCUMENTS

| | | |
|---|---|---|
| 5,955,555 A | 9/1999 | Bennett |
| 6,030,917 A | 2/2000 | Weinberg et al. |
| 6,410,768 B1 * | 6/2002 | Llatas et al. ............ 556/424 |

FOREIGN PATENT DOCUMENTS

| | | |
|---|---|---|
| EP | 0953580 A1 | 3/1999 |
| WO | WO 9912981 A1 | 9/1998 |
| WO | WO 9928352 A1 | 12/1998 |
| WO | WO 0056786 A1 | 3/2000 |

OTHER PUBLICATIONS

Boussie et al., Tetrahedron 55 (1999) 11699–11710.*

Thomas R. Boussie, Vince Murphy, Keith A. Hall, Carla Coulard, Cameron Dales, Mirlslav Petro, Eric Carlson, Howard W. Turner and Timothy S. Powers, Parallel Solid–Phase Synthesis, Screening, and Encoding Strategies for Olefin–Polymerization Catalysts, Tetrahedron 55 (1999) 11699–11710.

* cited by examiner

Primary Examiner—Roberto Rabago

(57) ABSTRACT

A method for forming supported late transition metal olefin polymerization catalysts is described in which an already formed transition metal complex, usually containing a reactive functional group, is placed on a support containing a complementary reactive functional group. Also described are novel polymerization catalyst components containing late transition metal complexes of neutral tridentate ligands.

11 Claims, No Drawings

SUPPORTED OLEFIN POLYMERIZATION CATALYSTS

FIELD OF THE INVENTION

A method for forming supported late transition metal olefin polymerization catalysts is described in which an already formed transition metal complex, usually containing a reactive functional group, is placed on a support containing a complementary reactive functional group.

BACKGROUND

Olefin polymerization catalyst systems are an important commercial technology. In many instances these catalyst systems contain a transition metal complex which is essential to their catalytic activity. In recent years, polymerization catalysts containing late transition metals such as iron, cobalt, palladium and nickel have been developed, and in some instances these polymerization catalyst systems make unique polymers. It is well known in the art that polymerization catalysts containing transition metals are often advantageously used when the transition metal (complex) is part of a supporting material such as a polymer or an in-organic compound such as silica, alumina, a magnesium halide, etc. These supported catalysts are especially useful in so-called gas phase or liquid slurry polymerization processes.

In a simple process for supporting a transition metal containing polymerization catalyst, a solution of the appropriate transition metal compound is mixed with the desired support and the solvent is evaporated. In many such instances the transition metal containing polymerization catalyst may simply be coated (as paint is coated on a wall) onto the support and may be removed. In some instances, the support such as silica may be prereacted with another compound of the polymerization system such as an alkylaluminum compound and then this support mixed with the transition metal containing polymerization catalyst.

Another less common way to affix the transition metal containing polymerization catalyst to a support is through a covalent bonded linkage which is attached to both the support and the transition metal containing polymerization catalyst, see for instance EP-A-0953580 which describes the preparation of a heterogeneous catalyst containing metallocene-type catalysts. Metallocenes have anionic ligands.

U.S. Pat. No. 6,030,917 describes methods for making supported polymerization catalysts containing late transition metals having neutral ligands attached to them. In the methods described therein, the ligand is attached to the support first and then ligand is coordinated with the desired transition metal.

WO00/56786 and WO00/56787 describe the preparation of supported transition metal polymerization catalysts in which the transition metal is complexed to an anionic ligand, but not to a neutral ligand.

WO99/28352 describes the preparation of various supported polymerization catalysts containing transition metals. Some neutral ligands are used, but the metal is not complexed with the ligand until after the ligand is attached to the support.

U.S. Pat. No. 5,955,555 and WO99/12981 describe the use of certain iron and cobalt complexes containing neutral tridentate ligands as olefin polymerization catalysts. Although supported catalysts are mentioned, no mention is made of having reactive groups on the neutral tridentate ligands.

All of the above-mentioned publications are incorporated by reference herein for all purposes as if fully set forth.

SUMMARY OF THE INVENTION

This invention concerns a process for the preparation of a supported olefin polymerization catalyst component, comprising the step of contacting:

(a) a transition metal complex of a Group 6–10 transition metal (IUPAC notation), and a neutral bidentate or a neutral tridentate ligand, which ligand contains a first reactive group, with (b) a solid support which has attached to it a complimentary second reactive group, under conditions such that the first reactive group and complimentary second reactive group interact to form an ionic or covalent bond.

This invention also concerns a supported olefin polymerization catalyst component, comprising a transition metal complex of a Group 6–10 transition metal and a neutral tridentate ligand, and a support material, whereby said transition metal complex is bound to said support material through an ionic or covalent bond between said neutral tridentate ligand and said support.

This invention still further concerns a process for the polymerization of one or more olefins, comprising the step of contacting said one or more olefins with an olefin polymerization catalyst under polymerization conditions, whereby said olefin polymerization catalyst comprises the aforementioned tridentate ligand based polymerization catalyst component, or a polymerization catalyst component obtained by the aforementioned process.

These and other features and advantages of the present invention will be more readily understood by those of ordinary skill in the art from a reading of the following detailed description. It is to be appreciated that certain features of the invention which are, for clarity, described below in the context of separate embodiments, may also be provided in combination in a single embodiment. Conversely, various features of the invention which are, for brevity, described in the context of a single embodiment, may also be provided separately or in any subcombination.

DETAILED DESCRIPTION OF THE PREFERRED EMBODIMENTS

Herein, certain terms are used. Some of them are:

A "hydrocarbyl group" is a univalent group containing only carbon and hydrogen. As examples of hydrocarbyls may be mentioned unsubstituted alkyls, cycloalkyls and aryls. If not otherwise stated, it is preferred that hydrocarbyl groups herein contain 1 to about 30 carbon atoms.

By "substituted hydrocarbyl" herein is meant a hydrocarbyl group that contains one or more (types of) substituents that do not substantially interfere with the operation of the polymerization catalyst system. Suitable substituents in some polymerizations may include some or all of halo, ester, keto (oxo), amino, imino, carboxyl, phosphite, phosphonite, phosphine, phosphinite, thioether, amide, nitrile, and ether. Preferred substituents when present are halo, ester, amino, imino, carboxyl, phosphite, phosphonite, phosphine, phosphinite, thioether, and amide. Which substituents are useful in which polymerizations may in some cases be determined by reference to previously incorporated U.S. Pat. No. 5,955,555, as well as U.S. Pat. No. 5,880,241 (also incorporated by reference herein for all purposes as if fully set forth). If not otherwise stated, it is preferred that substituted hydrocarbyl groups herein contain 1 to about 30 carbon atoms. Included in the meaning of "substituted" are chains or rings containing one or more heteroatoms, such as nitrogen, oxygen and/or sulfur, and the free valence of the substituted hydrocarbyl may be to the heteroatom. In a substituted hydrocarbyl, all of the hydrogens may be substituted, as in trifluoromethyl.

By "(inert) functional group" herein is meant a group other than hydrocarbyl or substituted hydrocarbyl that is, other than participating in the ionic or covalent bond between the ligand and support, inert under the process conditions to which the compound containing the group is subjected. The functional groups also do not substantially interfere with any process described herein that the compound in which they are present may take part in. Examples of functional groups include some halo groups (for example fluoro and some unactivated chloro) ether such as —$OR^{22}$ wherein $R^{22}$ is hydrocarbyl or substituted hydrocarbyl. In cases in which the functional group may be near a metal atom, the functional group should not coordinate to the metal atom more strongly than the groups in those compounds are shown as coordinating to the metal atom, that is they should not displace the desired coordinating group.

By an "activator", "cocatalyst" or a "catalyst activator" is meant a compound that reacts with a transition metal compound to form an activated catalyst species. This transition metal compound may be added initially, or may be formed in situ, as by reaction of a transition metal compound with an oxidizing agent. A preferred catalyst activator is an "alkyl aluminum compound", that is, a compound which has at least one alkyl group bound to an aluminum atom. Other groups such as, for example, alkoxide, hydride and halogen, may also be bound to aluminum atoms in the compound.

"Alkyl group" and "substituted alkyl group" have their usual meaning (see above for substituted under substituted hydrocarbyl). Unless otherwise stated, alkyl groups and substituted alkyl groups preferably have 1 to about 30 carbon atoms.

By "aryl" is meant a monovalent aromatic group in which the free valence is to the carbon atom of an aromatic ring. An aryl may have one or more aromatic rings which may be fused, connected by single bonds or other groups.

By "substituted aryl" is meant a monovalent aromatic group substituted as set forth in the above definition of "substituted hydrocarbyl". Similar to an aryl, a substituted aryl may have one or more aromatic rings which may be fused, connected by single bonds or other groups; however, when the substituted aryl has a heteroaromatic ring, the free valence in the substituted aryl group can be to a heteroatom (such as nitrogen) of the heteroaromatic ring instead of a carbon.

By a "neutral" ligand is meant a ligand that electrically neutral, that is bears no charge. Another way of putting this is that the ligand is not ionic. However, the ligand may contain a functional group that is an anion but, when the ligand is complexed with a transition metal, such functional group is not coordinated to the transition metal and thus is free to ionically or covalently bond to a support.

By a "bidentate" ligand is meant a ligand that is capable of being a bidentate ligand, that is it has two sites, often heteroatom sites, that can coordinate to a transition metal atom simultaneously. Preferably both sites do coordinate to the transition metal.

By a "tridentate" ligand is meant a ligand that is capable of being a tridentate ligand, that is it has three sites, often heteroatom sites, that can coordinate to a transition metal atom simultaneously. Preferably all three sites do coordinate to the transition metal.

By a "first reactive group" is meant a group, usually a functional group which is reactive (see below), and whose presence does not substantially interfere with the functioning of the transition metal complex as a component of an olefin polymerization catalyst system. Typically this group will be placed at a location in the transition metal complex which is somewhat remote from the transition metal atom itself, so as to avoid potential interference in the catalytic function of the complex.

By a "complimentary second reactive group" is meant a reactive group which is part of the support, or is placed on the support, which usually (that is usually reacts in similar situations) reacts under the process conditions of the contacting with the first reactive group to in effect connect, preferably covalently connect, the support and the transition metal complex.

By a "neutral tridentate ligand is bound to said support through an ionic or covalent bond" is meant that the ligand is bound to the support through a group bound to the neutral tridentate ligand and not through a "bridging group" which includes the transition metal and/or any other ligand (other than the neutral tridentate ligand) bound to the transition metal.

When the transition metal complex and the support are mixed the second reactive group may not be present yet on the support, but another reagent may be added (either before, simultaneously with or after the transition metal complex is contacted) which "reacts" with the support and forms the complimentary second reactive group on the support. The first reactive group of the transition metal complex may also be formed in a similar way, although it is preferred that it be formed before coming into contact with the support.

The first reactive group may be any reactive group which is covalently bonded to the neutral bidentate or tridentate ligand. Reactive groups include, but are not limited to, hydroxyl, carboxyl, amino, carboxyl ester, alkoxysilane, thiol, siloxane, silanol, hydrosilane (silicon hydride), aminosilane, halosilane, alkyl groups bound to aluminum, zinc or magnesium, borane, sulfonate ester, epoxide, ketone, aldehyde, carboxylate salt, isocyanate, ammonium salt, phosphine, and sulfonate salt. Preferred first reactive groups are hydroxyl, amino, carboxyl, carboxyl ester, alkoxysilane, halosilane, and hydroxyl and amino are especially preferred. Usually the neutral bidentate or tridentate ligand containing the first reactive group will be synthesized and then coordinated to the transition metal atom by reaction with an appropriate transition metal compound. Typical useful types of neutral bidentate and tridentate ligands will be found in previously incorporated U.S. Pat. No. 5,880,241, U.S. Pat. No. 5,955,555 and WO9912981, as well as in U.S. Pat. No. 5,932,670, U.S. Pat. No. 6,034,259, U.S. Pat. No. 5,714,556, U.S. Pat. No. 6,103,658, U.S. Pat. No. 6,174,976, WO9847934, WO9840420, WO9946302, WO9946303, WO9946304, WO0006620, WO0018776, WO0020427, WO0050470 and WO0059914, all of which are also incorporated by reference herein for all purposes as if fully set forth. These references describe which transition metals are useful with these types of ligands, and also describe how to make the complexes of these ligands with appropriate transition metals, and reference may be had thereto for further details.

The complimentary second reactive group is a functional group that, under the contacting conditions (contacting of the transition metal compound and support), normally reacts with the first reactive group. Such pairs are well known in the art. For example, functional groups which are complimentary with a hydroxyl group include isocyanate, acyl halide, alkoxysilane, aminosilane, halosilane, alkyl groups bound to aluminum, zinc or magnesium, epoxide, carboxyl, carboxylic anhydride, and borane. Table 1 lists other first reactive groups and potential groups useful as complimentary second reactive groups. This list is not all inclusive for any first reactive group.

TABLE 1

| First Reactive Group | Second Reactive Group(s) |
|---|---|
| carboxylic acid halide | hydroxyl, amino |
| carboxylic acid | hydroxyl, amino, epoxide, isocyanate, alkyl groups bound to aluminum |
| carboxylic acid anhydride | hydroxyl, amino, alkyl bound to aluminum |
| carboxyl ester | alkyl groups bound to aluminum |
| cyano | alkyl groups bound to aluminum, hydroxyl |
| sulfonyl halide | hydroxyl, amino |
| amino | epoxide, isocyanate, carboxylic acid, carboxylic acid anhydride, carboxylic acid halide, alkyl halide, alkyl groups bound to aluminum, halosilane |
| hydroxyl | epoxide, isocyanate, carboxylic acid anhydride, carboxylic acid halide, alkyl groups bound to aluminum, alkyl groups bound to zinc, alkyl groups bound to magnesium, halosilane, alkoxysilane, siloxane, borane |
| thiol | epoxide, isocyanate, carboxylic acid anhydride, carboxylic acid halide, alkyl groups bound to aluminum, halosilane, alkoxysilane, siloxane, borane |
| ketone | alkyl groups bound to aluminum, amino |
| aldehyde | alkyl groups bound to aluminum, amino |
| epoxide | hydroxyl, isocyanate, carboxylic acid, carboxylic acid anhydride, carboxylic acid halide, alkyl groups bound to aluminum, halosilane, alkoxysilane, siloxane, phosphine |
| isocyanate | hydroxyl, carboxylic acid |
| borane | Hydroxyl |
| alkoxysilane, halosilane, siloxane | hydroxyl, amino |
| silanol | epoxide, isocyanate, carboxylic acid, carboxylic acid anhydride, carboxylic acid halide, alkyl groups bound to aluminum, alkyl groups bound to zinc, halosilane, alkoxysilane, siloxane, borane |
| phosphine | alkyl halide, epoxide |
| alkyl halide | amino, phosphine |
| borane | Hydroxy |
| carboxylate salt | Ammonium salt, positive charged support |
| sulfonate salt | Ammonium salt, positive charged support |
| ammonium salt | Carboxylate salt, sulfonate salt, negative charged clay minerals |

Preferred "pairs" of functional groups include: hydroxyl and aluminum alkyl, hydroxyl and halosilane, hydroxyl and alkoxysilane, hydroxyl and epoxide, hydroxyl and carboxylic acid anhydrides, amino and aluminum alkyl, amino and halosilane, amino and alkyl halides, aldehydes and aluminum alkyl, ketones and aluminum alkyl, esters and aluminum alkyl; especially preferred are hydroxyl and aluminum alkyl, amino and aluminum alkyl. Note that in principle in such "pairs", the first reactive group is interchangeable with the second reactive group. This interchangeability will be limited to some degree by the ability to synthesize the ligand containing the first reactive group and then form the transition metal complex, as well as the ability to synthesize a support containing any particular second reactive group.

The reactive pairs of first and second reactive groups would normally be expected under most circumstances to react with each other to form linkages between the moieties that two groups were originally bound to. These linkages may be covalent bonds or ionic "bonds". It is preferred that these first and second reactive groups be chosen so that covalent bonds would normally be thought to be formed by reaction of the first and second reactive groups. It is preferred also that the neutral bidentate or tridentate ligand is bound to the support through a group bound to the neutral bidentate or tridentate ligand and not through a "bridging group" which includes the transition metal and/or any other ligand (other than the neutral tridentate ligand) bound to the transition metal. This will normally be the case when the first reactive group is attached to the neutral bidentate or tridentate ligand.

Depending on what the supporting material is, the second functional group may "inherently" be part of the support. For example, if the support is an organic polymer, a functional group which was part of one of the monomers used to prepare that polymer may be the second functional group. An example of this would be a halo group which can react with an amino first reactive group. If the support is an inorganic material, for example silica based, a hydroxyl group which is a first reactive group may react with a silanol or a siloxane (particularly when the silica is highly dehydrated) to attach the ligand essentially as an alkoxysilane group onto the silica support.

As mentioned above the first and/or second reactive groups may be formed before, during or after the contacting of the metal complex and the support. For instance a silica support may be reacted with an alkylaluminum compound in such a manner so that not all of the alkyl groups bonded to aluminum are reacted. This is usually believed to attach alkylaluminum compounds to the silica surface. A transition metal complex having hydroxyl groups bonded to the ligand may then be added. Under these conditions hydroxyl groups normally react with (some of) the remaining alkylaluminum groups on the surface of the support. The procedure can also be run in "reverse", the transition metal complex reacted with an alkylaluminum compound and then the silica support added. In a third procedure, the transition metal complex with a hydroxyl group, the silica and the alkylaluminum compound may be contacted essentially simultaneously. Silicon compounds such as dialkoxysilanes, dihalosilanes, diaminosilanes and silicon hydrides may be used in methods analogous to the use of alkylaluminum compounds. Other procedures will be evident to the artisan, and may also be found in previously incorporated U.S. Pat. No. 6,030,917, WO99/28352, WO00/56786, WO00/56787 and EP-A-0953580.

A preferred neutral bidentate ligand is

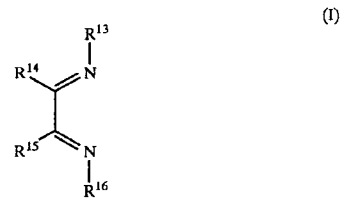

(I)

wherein:

$R^{13}$ and $R^{16}$ are each independently hydrocarbyl or substituted hydrocarbyl, provided that the atom bound to the imino nitrogen atom has at least two carbon atoms bound to it; and $R^{14}$ and $R^{15}$ are each independently hydrogen, hydrocarbyl, substituted hydrocarbyl or an inert functional group, or $R^{14}$ and $R^{15}$ taken together are hydrocarbylene or substituted hydrocarbylene to form a carbocyclic ring.

As examples of when $R^{14}$ and $R^{15}$ are each independently a substituted hydrocarbyl may be mentioned when $R^{14}$ is -A(R$^{17}$)(R$^{18}$) and R$^{15}$ is -E(R$^{19}$) (R$^{20}$), wherein A and E are each independently nitrogen, oxygen, phosphorous or sulfur and R$^{17}$ and R$^{19}$ are each independently hydrocarbyl, or substituted hydrocarbyl or taken together form a ring, and R$^{18}$ and R$^{20}$ are each independently hydrogen, hydrocarbyl, or substituted hydrocarbyl, provided that when A is oxygen or sulfur R$^{18}$ is not present, and when E is oxygen or sulfur R$^{20}$ is not present.

In one preferred embodiment of (I), at least one of R$^{14}$ and R$^{15}$ is an inert functional group constituting the first reactive group, or a substituted hydrocarbyl containing such an inert functional group. More preferably, at least one of R$^{14}$ and R$^{15}$ is a substituted hydrocarbyl containing such an inert functional group.

In another preferred embodiment of (I), at least one of R$^{13}$ and R$^{16}$ is a substituted hydrocarbyl containing an inert functional group constituting the first reactive group. In a particularly preferred embodiment, at least one of R$^{13}$ and R$^{16}$ is a substituted aryl which is substituted with such an inert functional group at a position remote from the imino nitrogen (e.g., the 4-position), or a substituted hydrocarbyl (e.g., substituted alkyl) containing such an inert functional group.

A preferred neutral tridentate is

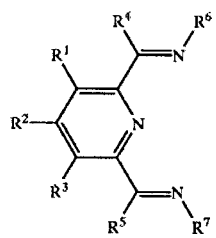

(II)

wherein:

R$^1$, R$^2$, R$^3$, R$^4$ and R$^5$ are each independently hydrogen, hydrocarbyl, substituted hydrocarbyl, or an inert functional group, provided that any two of R$^1$, R$^2$ and R$^3$ vicinal to one another, taken together may form a ring; and R$^6$ and R$^7$ are aryl or substituted aryl.

In one preferred embodiment of (II), at least one of R$^1$, R$^2$, R$^2$, R$^3$, R$^4$ and R$^5$ is an inert functional group constituting the first reactive group, or a substituted hydrocarbyl containing such an inert functional group. More preferably, at least one of R$^1$, R$^2$, R$^3$, R$^4$ and R$^5$ (and particularly at least one of R$^1$, R$^2$ and R$^3$) is a substituted hydrocarbyl containing such an inert functional group.

In another preferred embodiment of (II), at least one of R$^6$ and R$^7$ is a substituted aryl containing an inert functional group constituting the first reactive group. In a particularly preferred embodiment, at least one of R$^6$ and R$^7$ is a substituted aryl which is substituted with such an inert functional group at a position remote from the imino nitrogen (e.g., the 4-position), or a substituted hydrocarbyl (e.g., substituted alkyl) containing such an inert functional group.

In other preferred forms of (I) and (II) it is preferred that R$^6$, R$^{7,}$ R$^{13}$ and R$^{16}$ are each independently diortho (substituted aryl), that is have aryl or substituted aryl groups in both ortho positions to the carbon atom bound to the imino nitrogen atom, and it is even more preferred that R$^6$, R$^7$, R$^{13}$ and R$^{16}$ are 2,6-diaryl(or substituted diaryl)phenyl groups. Preferred substitutents R$^6$, R$^7$, R$^{13}$ and R$^{16}$ may be found in analogous complexes [applicable to both (I) and (II) herein, no matter what type of complex they are found in these references] in WO0050471, and WO1042257, which is hereby included by reference. Therefore useful groups for R$^6$, R$^7$, R$^{13}$ and R$^{16}$ include groups such as 2,6-diphenylphenyl, 2,6-bis(2-methylphenyl)phenyl and 2,6-bis(4-t-butylphenyl)phenyl. In addition diortho substitution, other groups may also be substituted in the R$^6$, R$^7$, R$^{13}$ and R$^{16}$ moieties, including the first reactive group or a group containing the first reactive group, as described herein.

Preferred transition metals are in Groups 8–10. Preferred specific transition metals are Fe, Co, Pd, Ni, Mn and Ru, and more preferred metals are Fe, Co, Pd and Ni. With (I), Ni and Pd are preferred metals, and Ni is especially preferred, while with (II) Fe and Co are preferred and Fe is especially preferred.

A preferred olefin for polymerization (including oligomerization) with the present supported catalysts is ethylene, or a combination of ethylene and an olefin of the formula R$^8$CH=CH$_2$ wherein R$^8$ is n-alkyl, the latter to give an ethylene copolymer. Another preferred combination of olefins is ethylene with an olefin containing a polar group, such as methyl acrylate. Which catalysts can be used to polymerize which olefin(s) will be found in previously incorporated U.S. Pat. No. 5,880,241, U.S. Pat. No. 5,932,670, U.S. Pat. No. 5,955,555, U.S. Pat. No. 6,034,259, U.S. Pat. No. 5,714,556, U.S. Pat. No. 6,103,658, U.S. Pat. No. 6,174,976, WO98/47934, WO98/40420, WO99/12981, WO99/46302, WO99/46303, WO99/46304, WO00/06620, WO00/18776, WO00/20427, WO00/50470 and WO00/59914, and other references known to the artisan.

Also the polymerization conditions for the present supported catalysts are the same as reported previously for those of these classes already known, as disclosed in the aforementioned incorporated references as well as U.S. Pat. No. 5,852,145, U.S. Pat. No. 6,063,881, U.S. Pat. No. 6,114,483, U.S. Pat. No. 6,150,482, WO97/48735, WO98/56832, WO99/50318, WO99/62963, WO99/62967, WO0010945, WO00/22007 and WO00/50475, all of which are also incorporated by reference herein for all purposes as if fully set forth. These references also describe the use of olefin polymerization catalysts containing these types of transition metal catalysts in various ways, such as the types (gas phase, slurry, etc.) of polymerization processes that may be used, modifiers (hydrogen for example) that may be added, and the use of more than one polymerization catalyst to produce various kinds of polymer products. All of these processes are equally applicable to the present supported catalysts. For example, more than one transition metal complex may be on the catalyst support, one or both them being attached through first reactive groups.

Preferred supports are organic polymers, especially those containing a complimentary second reactive group as part of their polymer "structure", inorganic oxides such as silica, silica gel, or alumina, a magnesium halide, titania, and clay minerals. Especially preferred supports include organic polymer, especially those containing a complimentary second reactive group as part of their polymer "structure", silica, alumina, and alumina silicates. Loadings of the transition metal complex onto the supports may the same as those conventionally used with other similar supported catalysts.

The supported olefin polymerization catalyst component, comprising, a Group 6–10 transition metal complex containing a neutral tridentate ligand complexed to said transition metal, and a support material, provided that said neutral tridentate ligand is bound to said support through an ionic or covalent bond, may be made by the methods described herein, that is the fully formed complex (including transition metal) may be contacted with the support, or the ligand (without transition metal) can be contacted with the support and then the ligand complexed with the transition metal.

In the Examples, the following abbreviations are used:

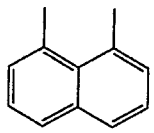

An— dme—1,2-dimethoxyethane

Me—methyl

MMAO—methyl aluminoxane modified with isobutyl groups

Rt—room temperature

THF—tetrahydrofuran

TLC—thin layer chromatography

The following convention is used for describing some of the complexes: (i)DAB(ii), wherein DAB stands for α-diimine; (i) are the groups attached to the nitrogen (see $R^{13}$ and $R^{16}$ in (I)); and (ii) are the group(s) on the two carbon atoms of the α-diimine (see $R^{14}$ and $R^{15}$ in (I)). More details on this nomenclature will be found in previously incorporated U.S. Pat. No. 6,034,259.

EXAMPLE 1

Synthesis of 3-(4-Amino-3,5-dimethylphenyl) propan-1-ol

Palladium acetate (68 mg) and 720 mg of tris-o-tolylphosphine were mixed in a Schlenk tube under a nitrogen atmosphere. After 15 ml of triethylamine, 6 g of 4-bromo-2,6-dimethylaniline and 3.2 g of methyl acrylate had been added, the tube was heated to 100° C. in an oil bath and kept there for 6 h. The mixture was added to water and extracted 3 times with ethyl ether. After drying in vacuum 6.2 g of a yellow solid was obtained. The solid was dissolved in THF and 3.5 g of lithium aluminum hydride was added. After 6 h the reaction was poured into water and purified by column chromatography (silica, hexane:ethyl acetate 2:1). A mixture of 3-(4-amino-3,5-dimethyl-phenyl-propan-1-ol and 3-(4-amino-3,5-dimethylphenyl)propan-1-ol (3.5 g) was obtained. The mixture was dissolved in ethyl acetate and 50 mg of palladium (10 wt %) on carbon was added. Hydrogen was bubbled through the solution for one h. After removing the palladium catalyst and the solvent, 3.1 g of 3-(4-amino-3,5-dimethyl-phenyl)-prop-2-en-1-ol was obtained. $^1$H-NMR (200 MHz, CDCl$_3$): 6.77 (s, 2H), 3.64 (t, 2H), 3.47 (b s, 2H) 2.54 (t, 2H), 2.15 (s, 6H), 1.82 ppm (m, 2H).

EXAMPLE 2

Synthesis of (2,6-Me$_2$-4-(3-hydroxypropyl)Ph)$_2$DABAn 3-(4-Amino-3,5-dimethylphenyl)propan-1-ol (2.9 g) and 1.33 g acenapthoquinone were solved in 60 ml of toluene. After 0.1 ml of sulfuric acid had been added, the solution was refluxed and the water produced was removed by using a Dean-Stark trap. The red product was purified by column chromatography (silica, solvent ethyl acetate:hexane 3:1). Yield: 2.2 g of diimine. $^1$H-NMR (200 MHz, CDCl$_3$): 7.86 (d, 2H), 7.37 (t, 2H), 6.97 (s, 4H), 6.69 (d, 2H), 3.74 (quart., 4H), 2.72 (t, 4H), 2.13 (s, 8H), 1.97 ppm (t, 4H)

EXAMPLE 3

Synthesis of (2,6-Me$_2$-4-(3-hydroxypropyl)Ph)$_2$DABAnNiBr$_2$ (2,6-Me$_2$-4-(3-hydroxypropyl)Ph)$_2$DABAn (1785 mg) and 993 mg of NiBr$_2$ dme were stirred in 30 ml of CH$_2$Cl$_2$ for 16 h. After removal of the solvent, the brown powder was washed 3 times with diethyl ether. Yield: 2.5 g of brown powder.

EXAMPLE 4

Synthesis of Support, SiO$_2$/Me$_3$Al

Silica (Grace XPO 2402), 8 g, was mixed with 40 ml of dry toluene and 12 ml of a 2M Me$_3$Al in hexane solution (Aldrich) was added. After 2 h the silica was washed 3 times with toluene and once with pentane. Afterwards the material was dried in vacuum at 25° C.

EXAMPLE 5

Synthesis of Support, SiO$_2$/Me$_2$AlCl

Silica (Grace XPO 2402), 6 g, was mixed with 30 ml of dry toluene and 15 ml of a 1M Me$_2$AlCl solution in hexane (Aldrich) was added. After 2 h the silica was washed 3 times with toluene, once with pentane and then dried in vacuum.

EXAMPLE 6

Supporting of (2,6-Me$_2$-4-(3-hydroxypropyl)Ph)$_2$DABAnNiBr$_2$ on SiO$_2$/Me$_3$Al Four hundred mg of SiO$_2$/Me$_3$Al from Example 4 was mixed with a solution of 56.4 mg (2,6-Me$_2$-4-(3-hydroxypropyl)Ph)$_2$DABAnNiBr$_2$ (from Example 3) in 10 ml CH$_2$Cl$_2$. After one h the clear CH$_2$Cl$_2$ phase was subjected to a vacuum, and the brown solid remaining was washed once with CH$_2$Cl$_2$.

EXAMPLE 7

Supporting of (2,6-Me$_2$-4-(3-hydroxypropyl)Ph)$_2$DABAnNiBr$_2$ on SiO$_2$/Me$_3$Al One hundred mg of SiO$_2$/Me$_3$Al from Example 4 were mixed with a solution of 58.7 mg (2,6-Me$_2$-4-(3-hydroxypropyl)Ph)$_2$DABAnNiBr$_2$ (from Example 3) in 12 ml CH$_2$Cl$_2$. After one h the colored CH$_2$Cl$_2$ phase was filtered off and the brown solid was washed once with CH$_2$Cl$_2$.

EXAMPLE 8

Supporting of (2,6-Me$_2$-4-(3-hydroxypropyl)Ph)$_2$DABAnNiBr$_2$ on SiO$_2$/Me$_2$AlCl Two hundred mg of SiO$_2$/Me$_2$AlCl from Example 5 was mixed with a solution of 24 mg (2,6-Me$_2$-4-(3-hydroxypropyl)Ph)$_2$DABAnNiBr$_2$ (from Example 3) in 60 ml CH$_2$Cl$_2$. After 2 h the slightly yellow solution was decanted and the remaining yellow solid dried in vacuum after washing 2 times with CH$_2$Cl$_2$.

EXAMPLE 9

Polymerization of Ethylene with Catalyst of Example 6

One hundred ml pentane and 1.2 ml of 0.91 M solution of ethyl aluminum sesquichloride in toluene were pumped into a 300 ml Parr® autoclave. The catalyst synthesized (6.5 mg) in Example 6 was added and the reactor was heated to 60° C. and pressurized with 1.03 MPa of ethylene. After 2 h the polymerization was quenched by addition of methanol. White polyethylene particles (27.4 g) were obtained.

EXAMPLE 10

Polymerization of Ethylene with Catalyst of Example 6

One hundred ml pentane, 0.1 ml of 0.91M ethyl aluminum sesquichloride in toluene, and 6.9 mg of the catalyst synthesized in Example 6 were combined in a 300 ml autoclave. After 2 h at 60° C. and 1.03 MPa ethylene, 28.1 g of PE was obtained.

EXAMPLE 11

Polymerization of Ethylene with Catalyst of Example 7

One Hundred ml pentane, 1.0 ml of 0.91M ethyl aluminum sesquichloride in toluene, and 3.7 mg of the catalyst synthesized in Example 7 were combined in a 300 ml autoclave. After 2 h at 60° C. and 1.03 MPa ethylene, 38.2 g of polyethylene was obtained.

EXAMPLE 12

Polymerization of Ethylene with Catalyst of Example 8

One hundred ml pentane, 1.7 ml of a 1M $Me_2AlCl$ solution in hexane, and 40.5 mg of the catalyst synthesized in Example 8 were combined in a 300 ml autoclave. After 30 min at 50° C. and 1.10 MPa ethylene, 21 g of polyethylene was obtained.

EXAMPLE 13

Synthesis of 2,6-Bis-[1-(4-hydroxy-2-methylphenylimino)ethyl]pyridine

4-Amino-m-cresol (450 mg) and 300 mg 2,6-diacetylpyridine were dissolved in 20 ml methanol. Four drops of formic acid were added and the solution was stirred for 2 d. The yellow solid was washed with cold methanol. Yield: 600 mg. $^1$H-NMR (200 MHz, $CDCl_3$): 8.35 (d, 2H), 7.85 (t, 1H), 6.53–6.74 (6 H), 4.50 (s, 2H), 2.32 (s, 6H), 2.09 ppm (s, 6H)

EXAMPLE 14

Synthesis of 2,6-Bis-[1-(4-hydroxy-2-methylphenylimino)ethyl]pyridine iron(II) chloride 2,6-Bis-[1-(4-hydroxy-2-methylphenylimino)ethyl] pyridine (73 mg) from Example 13 and 38 mg of $FeCl_2.4H_2O$ were stirred in 10 ml THF for 16 h. After removal of the solvent by cannula transfer, the black powder was washed 3 times with THF. Yield 90 mg.

EXAMPLE 15

Supporting of 2,6-bis-[1-(4-hydroxy-2-methylphenylimino)ethyl]pyridine Iron(II) Chloride on $SiO_2/Me_3Al$ One hundred mg of $SiO_2/Me_3Al$ from Example 4 was mixed with a solution of 10.5 mg 2,6-bis-[1-(4-hydroxy-2-methylphenylimino)ethyl]pyridine iron(II) chloride in 10 ml toluene. After 4 h the toluene phase was decanted and the black solid was washed once with toluene.

EXAMPLE 16

Polymerization of Ethylene with Catalyst of Example 15

One hundred ml pentane and 1 ml MMAO solution in toluene (7 wt % Al) were pumped in a 300 ml Parr® autoclave. Catalyst (15.9 mg) synthesized in Example 15 was added and the reactor was heated to 60° C. and pressurized with 1.03 MPa of ethylene. After 60 min the polymerization was quenched by addition of water. The particles insoluble in pentane at 25° C. were filtered off (6.1 g). The pentane phase was separated from the water in a separatory funnel. The pentane was distilled from the pentane phase (head temperature 38° C.), and 6.2 g of an oil was obtained which turned solid on cooling to 20° C. The solid insoluble in pentane had a melting point of 80–110° C., while the materiel in the pentane phase was analyzed by $^1$H NMR and shown to be predominantly α-olefins with an average chain length of 12 carbon atoms.

EXAMPLE 18

Synthesis of 2,6-bis-[1-(2,6-dimethyl-4-(3-hydroxypropyl)phenylimino)ethyl]pyridine 3-(4-Amino-3,5-dimethylphenyl)propan-1-ol (2.5 g) was synthesized following the method described in Example 1. Two g of it and 0.9 g 2,6-diacetylpyridine were dissolved in 3 ml methanol. Two drops of formic acid were added and the solution was refluxed for 40 h. The crude product was purified by column chromatography (silica, solvent ethyl acetate:hexane 1:1). Yield 1.5 g of yellow powder. $^1$H-NMR (200 MHz, CDCl3): 8.46 (d, 2H), 7.93 (t, 1H), 6.92 (s, 4H), 3.65 (t, 4H), 2.63 (t, 4H), 2.22 (s, 6H), 2.01 (s, 12H), 1.86 ppm (quin., 4H)

EXAMPLE 19

Synthesis of 2,6-bis-[1-(2,6-dimethyl-4-(3-hydroxypropyl)phenylimino)ethyl]pyridine Iron(II) Chloride Five hundred mg of 2,6-bis-[1-(2,6-dimethyl-4-(3-hydroxypropyl)phenylimino)ethyl]pyridine and 190 mg of $FeCl_2$ $4H_2O$ were stirred in 7 ml THF for 80 min. After filtration the remaining purple powder was washed 2 times with THF and once with diethyl ether. Yield 600 mg.

EXAMPLE 20

Supporting of 2,6-bis-[1-(2,6-dimethyl-4-(3-hydroxypropyl)phenylimino)ethyl]pyridine Iron(II) Chloride on $SiO_2/Me_3Al$ Three hundred mg of $SiO_2/Me_3Al$ from Example 4 was mixed with a solution of 38.5 mg 2,6-bis-[1-(2,6-dimethyl-4-(3-hydroxypropyl)phenylimino)ethyl]pyridine iron(II) chloride in 10 ml $CH_2Cl_2$. After 60 min the clear $CH_2Cl_2$ phase was decanted, and the green solid remaining was washed once with $CH_2Cl_2$.

EXAMPLE 21

Polymerization of Ethylene with Catalyst of Example 20

One hundred ml pentane, 1.0 ml MMAO solution in toluene (7 wt % Al) and 0.3 ml of trimethylaluminum (2 M solution in hexane) were pumped into a 300 ml Parr® autoclave. The heterogeneous catalyst synthesized in Example 20 (8.0 mg) was added and the suspension was stirred for 5 min at 25° C. Then the reactor was heated to 80° C. and pressurized with 2.75 MPa of ethylene. After 120 min the polymerization was quenched by addition of methanol. White polyethylene particles (51.9 g) were obtained.

EXAMPLE 22

Synthesis of (4-(4-Amino-3,5-$Me_2$-benzyl)-2,6-$Me_2$-Ph)$_2$DABAn

Three g of 4,4'-methylenebis(2,6-dimethylaniline) (from Aldrich) and 0.54 g acenaphthoquinone were dissolved in 50 ml toluene. Four drops of sulfuric acid were added and the solution was refluxed for 14 h and the water produced was removed continuously by using a Dean-Stark trap. The crude product was purified by column chromatography (silica, solvent ethyl acetate:hexane 1:1). Yield 1.2 g of red powder. $^1$H-NMR (200 MHz, $CD_2Cl_2$): 7.89 (d, 2H), 7.37 (t, 2H), 7.01 (s, 4H), 6.87 (s, 4H), 6.74 (s, 2H), 3.84 (s, 4H), 3.53 (s, 4H), 2.19 (s, 12H), 2.06 ppm (s, 12H)

EXAMPLE 23

Synthesis of (4-(4-Amino-3,5-$Me_2$-benzyl)-2,6-$Me_2$-Ph)$_2$DABAnNiBr$_2$

Sixty mg of (4-(4-amino-3,5-$Me_2$-benzyl)-2,6-$Me_2$-Ph)$_2$DABAn and 28 mg of NiBr$_2$.dme were stirred in 5 ml $CH_2Cl_2$ for 14 h. After the solvent had been removed via vacuum, the brown product was washed 2 times with diethyl ether. Yield 70 mg of brown powder.

EXAMPLE 24

Supporting of (4-(4-Amino-3,5-$Me_2$-benzyl)-2,6-$Me_2$-Ph)$_2$DABAnNiBr$_2$ on $SiO_2$/$Me_3$Al One hundred mg of $SiO_2$/$Me_3$Al from Example 4 was mixed with a solution of 17.5 mg (4-(4-amino-3,5-$Me_2$-benzyl)-2,6-$Me_2$-Ph)$_2$DABAnNiBr$_2$ in 2 ml $CH_2Cl_2$. After 60 min the $CH_2Cl_2$ phase was subjected to vacuum, and the brown solid remaining was washed three times with $CH_2Cl_2$.

EXAMPLE 25

Polymerization of Ethylene with Catalyst of Example 24

One hundred ml pentane, 1.0 ml of 0.91M solution of ethyl aluminum sesquichloride in toluene were pumped into a 300 ml Parr® autoclave. The catalyst synthesized in Example 24 (11.9 mg) was added and the reactor was heated to 60° C. and pressurized with 1.03 MPa of ethylene. After 120 min the polymerization was quenched by addition of methanol. White polyethylene particles (38.7 g) were obtained.

EXAMPLE 26

Synthesis of 2,6-Bis-[1-(4-amino-2,3,5,6-tetramethyl-phenylimino)ethyl]pyridine

Eight hundred mg of 2,3,4,5-tetramethyl-1,4-phenylenediamine (from Aldrich) and 200 mg 2,6-diacetylpyridine were dissolved in 6 ml methanol. Two drops of formic acid were added and the solution was stirred for 16 h. Yellow crystals precipitated and were washed 2 times with cold methanol. Five hundred mg of yellow powder was obtained. $^1$H-NMR (200 MHz, $CDCl_3$): 8.44 (d, 2H), 7.91 (t, 1H), 3.45 (s, 4H), 2.15 (s, 6H), 2.13 (s, 12H), 1.94 ppm (s, 12H).

EXAMPLE 27

Synthesis of 2,6-Bis-[1-(4-amino-2,3,5,6-tetramethyl-phenylimino)ethyl]pyridine Iron(II) Chloride 2,6-Bis-[1-(4-amino-2,3,5,6-tetramethyl-phenylimino) ethyl]pyridine (240 mg) and 95 mg of $FeCl_2.4H_2O$ were stirred in 5 ml THF for 60 min. After filtration the remaining gray powder was washed 3 times with THF and once with diethyl ether. Yield 220 mg.

EXAMPLE 28

Supporting of 2,6-Bis-[1-(4-amino-2,3,5,6-tetramethyl-phenylimino)ethyl]pyridine Iron(II) Chloride on $SiO_2$/$Me_3$Al One hundred mg of $SiO_2$/$Me_3$Al from Example 4 was mixed with a solution of 11.6 mg 2,6-bis-[1-(4-amino-2,3,5,6-tetramethyl-phenylimino)ethyl]pyridine iron(II) chloride in 25 ml $CH_2Cl_2$. After 2 h the $CH_2Cl_2$ phase was decanted, and the black solid remaining was washed twice with $CH_2Cl_2$.

EXAMPLE 29

Polymerization of Ethylene with Catalyst of Example 28

One hundred ml pentane and 1.5 ml MMAO solution in toluene (7 wt % Al) were pumped into a 300 ml Parr® autoclave. The catalyst synthesized in Example 28 (13.6 mg) was added and the reactor was heated to 60° C. and pressurized with 2.75 MPa of ethylene. After 30 min the polymerization was quenched by addition of methanol. White polyethylene particles (17.1 g) were obtained.

EXAMPLE 30

Synthesis of 2-(4-amino-3,5-dibromo)ethan-1-ol

In a 1 L round bottom flask capped with a rubber septum, 2-(4-aminophenyl)ethanol (15 g, 109.3 mmol) was dissolved in 450 mL glacial acetic acid. Bromine (12.4 mL, 242 mmol) was added drop-wise with a syringe at RT within 20 min. After stirring for 30 additional min at RT, the reaction was poured into 2 L of ice water. The resulting solid was filtered in a Buchner filter and washed 5 times with 300 mL of ice water. The dibromide thus obtained was mostly in the acetate form. Yield 34 g (92.3%). $^1$H-NMR (300 MHz, $CDCl_3$) 7.21 (s, arom, 2H), 4.42 (br s, $NH_2$, 2H) 4.14 (t, $CH_2$—O, 2H), 2.75 (t, $CH_2$-Ph, 2H), 1.95 (s, $CH_3$—COOR, 3H). Hydrolysis of the acetate was achieved by dissolving the crude dibromide (20 g) in MeOH (150 mL), adding $K_2CO_3$ (20 g), 10 mL of $H_2O$ and stirring for 1 h at RT. The solution was then filtered and MeOH removed on a rotavap. The dibromide was then dissolved in diethyl ether (150 mL) and washed with water (150 mL) to remove residual contaminants. The water phase was extracted with diethyl ether. Both ether phases were combined and solvent removed (rotavap). A beige solid was obtained. Yield 12.8 g (73.1%). $^1$H-NMR (300 MHz, $CDCl_3$) 7.21 (s, arom, 2H), 4.42 (br s, $NH_2$, 2H) 3.77 (t, $CH_2$—O, 2H), 2.69 (t, $CH_2$-Ph, 2H), 1.58 (br s, OH, 1H).

EXAMPLE 31

Synthesis of 2-(4-amino-3,5-diphenyl)ethanol 2-(4-Amino-3,5-dibromo)ethanol (12.2 g, 41.4 mmol), tetrakis(triphenylphosphine)palladium (5.6 g, 5.0 mmol), phenylboronic acid (15.6 g, 127.9 mmol) and $Na_2CO_3$ (26.4 g, 248.7 mmol) were dissolved in a degassed mixture of 350 mL toluene, 75 mL ethanol and 125 mL of water, and refluxed under argon for 72 h. After cooling under argon, the water phase was extracted with diethyl ether and combined with the organic phase. The crude product was purified by column chromatography (silica gel/$CHCl_3$) under inert atmosphere. A first chromatographic column (W=45 mm, L=100 mm) was used to do a coarse separation and a second column (W=45 mm, L=210 mm) separated the desired ortho diphenyl substituted amine as the second main fraction (orange band). Column chromatography was followed by TLC. The ortho diphenyl substituted amine presented a characteristic blue spot under the UV lamp. After removing the solvent, 6.9 g of a yellow solid were obtained (57.2%). $^1$H-NMR (300 MHz, $CDCl_3$) 7.3–7.5 (m, arom, 10H), 6.98 (s, arom, 2H), 3.84 (t, $CH_2$—O, 2H), 2.82 (t, $CH_2$-Ph, 2H).

EXAMPLE 32

Synthesis of 2,3-Butanedione bis(2,6-diphenyl-4-hydroxyethylphenylimine)

In a 1 L closed round bottom flask 2.2 equiv of 2-(4-amino-3,5-diphenyl)ethanol (3 g, 10.4 mmol) were dissolved in benzene and a catalytic amount of p-toluenesulfonic acid monohydrate was added (110 mg, 0.58 mmol). Then 1 equiv of 2,3-butanedione (0.41 mL, 4.69 mmol) was added dropwise by syringe with stirring. After that, the flask was connected to a Dean Stark trap and a reflux condenser. After refluxing the mixture for 48 h, the solvent was removed. The crude product was purified in a short chromatographic column (silica, W=45 mm, L=100 mm). The diimine eluted as the second orange band, after elution of the unreacted amine, and after changing solvent mixture from $CHCl_3$/EtOAc (5:1) to $CHCl_3$/EtOAc (2:1). Solvent was removed and the diimine was further purified by dissolving in warm methylene chloride and adding pentane. A bright yellow solid precipitated upon storage at $-30°$ C. overnight. Yield 1.0 g (33.9%). $^1$H-NMR (300 MHz, $CDCl_3$) 7.08–7.25 (m, arom, 24H), 3.86 (t, $CH_2$—O, 4H), 2.87 (t, $CH_2$-Ph, 4H), 1.38 (s, $CH_3$—C=N, 6H). Anal. Calcd for $C_{44}H_{40}N_2O_2$: C, 84.04; H, 6.41; N, 4.46; O, 5.09. Found: C, 83.02; H, 6.41; N, 4.31; O, 5.12.

EXAMPLE 33

Synthesis of 2,3-Butanedione bis(2,6-diphenyl-4-hydroxyethylphenylimine)NiBr$_2$ 2,3-Butanedione-bis(2,6-diphenyl-4-hydroxyethylphenylimimine) (448 mg, 0.713 mmol) and $NiBr_2$(dme) (200 mg, 0.648 mmol) were stirred in 10 mL of dry $CH_2Cl_2$ for 18 h under argon. After removing the solvent under vacuum, the brown powder was washed 5 times with 15 mL of dry diethyl ether and cannula filtered. Yield 500 mg (91.1%). Anal. Calcd for $C_{44}H_{40}N_2O_2NiBr_2$: C, 62.37; H, 4.76; N, 3.31; O, 3.78. Found: C, 62.27; H, 4.86; N, 3.22; O, 4.04.

EXAMPLE 34

Preparation of Support $SiO_2$/Me$_3$Al

Silica (8 g) was gently mixed with 40 mL of dry toluene and 12 mL of a 2M Me$_3$Al hexane solution. For 2 h the reaction mixture was gently shaken several times, so as to avoid silica fragmentation. The treated silica was finally washed 3 times with toluene (40 mL) and once with pentane (40 mL). The material was dried under vacuum at 25° C.

EXAMPLE 35

Supporting 2,3-Butanedione bis(2,6-diphenyl-4-hydroxyethylphenylimine) NiBr$_2$ on $SiO_2$/Me$_3$Al 2,3-Butanedione-bis(2,6-diphenyl-4-hydroxyethylphenylimine)NiBr$_2$ (100 mg, from Example 33) was stirred for 15 minutes in 25 mL $CH_2Cl_2$. $SiO_2$/Me$_3$Al (600 mg, from Example 34) was added and gently mixed with the catalyst precursor. Almost instantaneously all catalyst precursor was trapped on the silica and the solution became clear. The reaction was allowed to proceed for 1 h, after which the $CH_2Cl_2$phase was removed under vacuum and the brown solid was washed once with 15 mL of $CH_2Cl_2$. After cannula filtering, the brown solid was dried under vacuum.

What is claimed is:

1. A process for the preparation of a supported olefin polymerization catalyst component, comprising the step of contacting:
   (a) a transition metal complex of a Group 6–10 transition metal (IUPAC notation), and a neutral bidentate or a neutral tridentate ligand, which ligand contains a first reactive group, with
   (b) a solid support which has attached to it a complimentary second reactive group, under conditions such that the first reactive group and complimentary second reactive group interact to form an ionic or covalent bond.

2. The process of claim 1, wherein said first reactive group is hydroxyl, carboxyl, amino, carboxyl ester, alkoxysilane, thiol, siloxane, silanol, hydrosilane, aminosilane, halosilane, alkyl groups bound to aluminum, zinc or magnesium, borane, sulfonate ester, epoxide, ketone, aldehyde, carboxylate salt, isocyanate, ammonium salt, phosphine, or sulfonate salt.

3. The process of claim 2, wherein said first reactive group is hydroxyl or amino.

4. The process of claim 3, wherein said complementary second reactive group is isocyanate, acyl halide, alkoxysilane, siloxane, silanol, hydrosilane, aminosilane, halosilane, an alkyl group bound to aluminum, zinc or magnesium, borane, phosphine, or alkyl halide.

5. The process of claim 1, wherein said support is an organic polymer, an inorganic oxide or a magnesium halide.

6. The process of claim 1, wherein said neutral bidentate ligand is

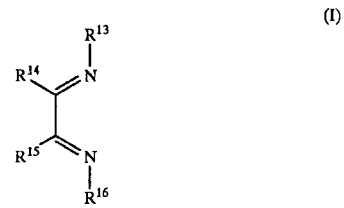

(I)

wherein:

$R^{13}$ and $R^{16}$ are each independently hydrocarbyl or substituted hydrocarbyl, provided that the atom bound to the imino nitrogen atom has at least two carbon atoms bound to it; and $R^{14}$ and $R^{15}$ are each independently hydrogen, hydrocarbyl, substituted hydrocarbyl or an inert functional group, or $R^{14}$ and $R^{15}$ taken together are hydrocarbylene or substituted hydrocarbylene to form a carbocyclic ring.

7. The process of claim 6, wherein said transition metal is nickel.

8. The process of claim 1, wherein said neutral tridentate ligand is

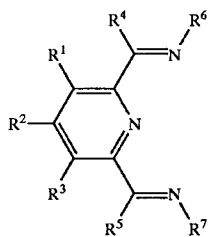

wherein:

$R^1$, $R^2$, $R^3$, $R^4$ and $R^5$ are each independently hydrogen, hydrocarbyl, substituted hydrocarbyl, or an inert functional group, provided that any two of $R^1$, $R^2$ and $R^3$ vicinal to one another, taken together may form a ring; and $R^6$ and $R^7$ are aryl or substituted aryl.

9. The process of claim 8, wherein said transition metal is iron or cobalt.

10. A supported olefin polymerization catalyst component, comprising a transition metal complex of a Group 6–10 transition metal and a neutral tridentate ligand, and a support material, whereby said transition metal complex is bound to said support material through an ionic or covalent bond between said neutral tridentate ligand and said support, wherein said tridentate ligand has the following structural formula (II)

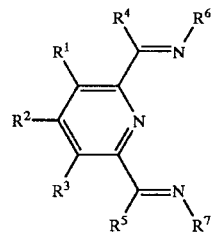

wherein $R^1$, $R^2$, $R^3$, $R^4$ and $R^5$ are each independently hydrogen, hydrocarbyl, substituted hydrocarbyl, or an inert functional group, provided that any two of $R^1$, $R^2$ and $R^3$ vicinal to one another, taken together may form a ring, and $R^6$ and $R^7$ are aryl or substituted aryl, and said tridentate ligand is bound to said support material through $R^1$, $R^2$, $R^3$, $R^6$ or $R^7$.

11. The supported olefin polymerization catalyst component of claim 10 wherein said transition metal is iron or cobalt.

* * * * *

(12) EX PARTE REEXAMINATION CERTIFICATE (7157th)
United States Patent
Preishuber-Pfluegl

(10) Number: US 6,900,153 C1
(45) Certificate Issued: Nov. 10, 2009

(54) SUPPORTED OLEFIN POLYMERIZATION CATALYSTS

(75) Inventor: Peter Preishuber-Pfluegl, Ludwiggshafen (DE)

(73) Assignee: University of North Carolina at Chapel Hill, Chapel Hill, NC (US)

Reexamination Request:
No. 90/008,080, Jun. 13, 2006

Reexamination Certificate for:
Patent No.: 6,900,153
Issued: Mar. 24, 2009
Appl. No.: 10/108,938
Filed: Mar. 27, 2002

Related U.S. Application Data

(60) Provisional application No. 60/307,985, filed on Jul. 26, 2001, and provisional application No. 60/279,207, filed on Mar. 28, 2001.

(51) Int. Cl.
*A61N 1/04* (2006.01)
*A61N 2/00* (2006.01)
*A61N 2/02* (2006.01)
*C08F 110/00* (2006.01)
*C08F 110/02* (2006.01)

(52) U.S. Cl. .............. 502/104; 502/109; 502/120; 502/156; 502/158; 502/167; 526/161; 526/169.1; 526/171; 526/172

(58) Field of Classification Search .............. None
See application file for complete search history.

(56) References Cited

U.S. PATENT DOCUMENTS 6,197,714 B1 * 3/2001 Bansleben et al. ........ 502/155
6,586,358 B2   7/2003 Llatas et al.

OTHER PUBLICATIONS

Itteli, et al., Late–Metal Catalysts for Ethylene Homo–Copylymerization, Chemical Reviews, vol. 100, pp. 1169–1203, 2000.
Gates, et al., Synthessis of Branched Pollyethylene Using . . . Structure on Polymer Properties, Macromolecules, vol. 33, pp. 2320–2334, 2000.

* cited by examiner

*Primary Examiner*—Jerry D. Johnson

(57) ABSTRACT

A method for forming supported late transition metal olefin polymerization catalysts is described in which an already formed transition metal complex, usually containing a reactive functional group, is placed on a support containing a complementary reactive functional group. Also described are novel polymerization catalyst components containing late transition metal complexes of neutral tridentate ligands.

EX PARTE REEXAMINATION CERTIFICATE ISSUED UNDER 35 U.S.C. 307

THE PATENT IS HEREBY AMENDED AS INDICATED BELOW.

AS A RESULT OF REEXAMINATION, IT HAS BEEN DETERMINED THAT:

The patentability of claims 10 and 11 is confirmed.
Claim 2 is cancelled.
Claims 1 and 3 are determined to be patentable as amended.
Claims 4-9, dependent on an amended claim, are determined to be patentable.

1. A process for the preparation of a supported olefin polymerization catalyst component, comprising the step of contacting:
   (a) a transition metal complex of a Group 6-10 transition metal (IUPAC notation), and a neutral bidentate *ligand* or a neutral tridentate ligand, which ligand contains a first reactive group, with
   (b) a solid support which has attached to it a complimentary second reactive group, under conditions such that the first reactive group and complimentary second reactive group interact to form an ionic or covalent bond,
   *and provided that when said transition metal complex contains said neutral bidentate ligand said first reactive group is selected from the group consisting of carboxylic acid halide, carboxylic acid, carboxylic acid anhydride, carboxyl ester, cyano, sulfonyl halide, amino, hydroxyl, thiol, ketone, aldehyde, epoxide, halosilane, siloxane, silanol, alkoxysilane, phosphine, alkyl halide, borane, carboxylate salt, sulfonate salt or ammonium salt.*

3. The process of claim [2]*1*, wherein said first reactive group is hydroxyl or amino.

* * * * *